US008805555B2

(12) United States Patent
Shimizu

(10) Patent No.: US 8,805,555 B2
(45) Date of Patent: Aug. 12, 2014

(54) CONFIGURING A PID CONTROLLER

(75) Inventor: Junya Shimizu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 13/232,026

(22) Filed: Sep. 14, 2011

(65) Prior Publication Data

US 2012/0083905 A1 Apr. 5, 2012

(30) Foreign Application Priority Data

Sep. 30, 2010 (JP) ................................. 2010-221054

(51) Int. Cl.
*G05B 13/02* (2006.01)
(52) U.S. Cl.
USPC ............................................. 700/42; 700/28
(58) Field of Classification Search
USPC .......... 700/28, 29, 31, 32, 40, 42; 702/13, 14, 702/15
See application file for complete search history.

(56) References Cited

U.S. PATENT DOCUMENTS

| 8,190,299 B2* | 5/2012 | Rovnyak et al. ............... 700/287 |
| 8,219,506 B2* | 7/2012 | Eberhart et al. .................. 706/3 |
| 8,275,488 B2* | 9/2012 | Kim et al. ....................... 700/287 |
| 2009/0198386 A1* | 8/2009 | Kim et al. ....................... 700/298 |
| 2011/0257799 A1* | 10/2011 | Al-Hamouz et al. .......... 700/287 |
| 2011/0257800 A1* | 10/2011 | Al-Hamouz et al. .......... 700/287 |

FOREIGN PATENT DOCUMENTS

JP 2009-199209 9/2009

OTHER PUBLICATIONS

Safonov, M.G., et al., "The unfatsified control concept and learning," To Appear IEEE Transactions on Automatic Control, vol. 42, No. 6, pp. 1-6, Jun. 1997.

* cited by examiner

*Primary Examiner* — Charles Kasenge
(74) *Attorney, Agent, or Firm* — Vazken Alexanian

(57) ABSTRACT

A method and system for configuring a PID controller. The method includes the steps of: providing initial values of a coefficient candidate group for a PID controller, where the coefficient candidate group includes coefficient candidates; providing an evaluation functional, where an unfalsified evaluation function is calculated from the evaluation functional; measuring an input and an output of a plant; selecting the coefficient candidates from the coefficient candidate group; calculating the evaluation functional using measured input and measured output for each of the coefficient candidates of the PID controller; removing a selected coefficient candidate if the evaluation functional is falsified as a result of a calculation of the evaluation functional; selecting new coefficient candidates as an update expression from remaining coefficient groups that have not been falsified; and repeating the steps of calculating and removing for each of the new coefficient candidates of an updated coefficient candidate group.

9 Claims, 5 Drawing Sheets

CONFIGURING A PID CONTROLLER

CROSS-REFERENCE TO RELATED APPLICATION

This application claims priority under 35 U.S.C. §119 from Japanese Patent Application No. 2010-221054 filed Sep. 30, 2010, the entire contents of which are incorporated herein by reference.

BACKGROUND OF THE INVENTION

1. Field of the Invention

The present invention relates to a proportional-integral-derivative controller (PID controller). More particularly, the present invention is related to a configuration method, program and system for determining coefficients for a PID controller.

2. Description of Related Art

Recently, robust control that uses H∞ or LMI (Linear Matrix Inequality) has been developed. Suitable design utilizing robust control is possible if reliable prior knowledge about an error limit with respect to the uncertainty of a plant is available. In many cases, however, only little plant information can be obtained or the plant information can be unreliable. In such cases, application of robust control is limited.

Proportional-integral-derivative controllers (PID controllers), which can be said to be classical, are still used for on-site designing. In some cases, a PID controller, which does not require a plant model, is used. In this case, the challenge is to determine the coefficients for the PID controller. A problem associated with a conventional way of determining PID coefficients is that, though it is theoretically effective up to a second order plant, a number of adjustments are required for a high-order plant and an unstable system.

At the time of designing a control system, a model based development (MBD) framework is effective, where SysML is used to describe how controller parameters are linked to requirements in order to derive a control strategy in a predetermined system. On the other hand, in cases where the structure of a plant is unknown, it is possible to tentatively operate the plant to a certain degree of performance and then predict the requirements for SysML. When the start is uncertain, automatic design of PID gain can be used to identify the extent of a control input influenced by an error, integral, and/or derivative. If successful, it becomes possible to start the description into a requirement diagram or a block definition diagram in SysML, and expand further from the result thereof.

Therefore, there is an increasing demand for a technique of automatically calculating a PID controller in an appropriate time setting.

It is known that there is a provision of an epoch-making method which realizes easiness of setting, where the method can be applied to a multiple-input multiple-output system by applying the concept of unfalsified control to offline control system design. Such method makes it possible to determine an optimum value of control gain by calculation. The disclosed method includes the steps of acquiring at least one input/output response data at the time of adding a step input or the like to a control target (plant) P, generating a predetermined number of or more virtual input/output response data on the basis of the data, substituting each of them into an unfalsified arithmetic expression to specify a predetermined number of or more unfalsified regions in a parameter space, and determining an optimum value of control gain in a region of a product set of a predetermined number of or more unfalsified areas by calculation by deriving a linear constraint expression from the unfalsified arithmetic expression.

It is known that there is a unfalsified control theorem that provides consistency with target performance and past experimental data without prior knowledge about a presented plant model. However, it is difficult to determine coefficients constituting a robust PID controller in an appropriate time only by a use of an unfalsified control technique.

SUMMARY OF THE INVENTION

Accordingly, one aspect of the present invention provides a method for determining coefficients for a proportional-integral-derivative controller (PID controller), the method including the steps of: providing initial values of a coefficient candidate group for a PID controller, where the coefficient candidate group includes coefficient candidates; providing an evaluation functional, where an unfalsified evaluation function is calculated from the evaluation functional; measuring an input and an output of a plant; selecting the coefficient candidates from the coefficient candidate group; calculating the evaluation functional using measured input and measured output for each of the coefficient candidates of the PID controller; removing a selected coefficient candidate if the evaluation functional is falsified as a result of a calculation of the evaluation functional; selecting new coefficient candidates as an update expression from remaining coefficient groups that have not been falsified, where the update expression is in the form of Particle Swarm Optimization (PSO); and repeating the steps of calculating and removing for each of the new coefficient candidates of an updated coefficient candidate group, where at least one of the steps is carried out using a computer device.

Another aspect of the present invention provides a computer readable storage medium tangibly embodying a computer readable program code having computer readable instructions which when implemented, cause a computer to carry out the steps of a method including: providing initial values of a coefficient candidate group for a PID controller, where the coefficient candidate group includes coefficient candidates; providing an evaluation functional, where an unfalsified evaluation function is calculated from the evaluation functional; measuring an input and an output of a plant; selecting the coefficient candidates from the coefficient candidate group; calculating the evaluation functional using measured input and measured output for each of the coefficient candidates of the PID controller; removing a selected coefficient candidate if the evaluation functional is falsified as a result of a calculation of the evaluation functional; selecting new coefficient candidates as an update expression from remaining coefficient groups that have not been falsified, where the update expression is in the form of Particle Swarm Optimization (PSO); and repeating the steps of calculating and removing for each of the new coefficient candidates of an updated coefficient candidate group.

Another aspect of the present invention provides a system for determining coefficients for a PID controller, the system including: an initial value module for providing initial values of a coefficient candidate group for a PID controller, where the coefficient candidate group includes coefficient candidates; an evaluation functional module for providing an evaluation functional, where an unfalsified evaluation function is calculated from the evaluation functional; a measuring module for measuring an input and an output of a plant; a selecting module for selecting the coefficient candidates from the coefficient candidate group; a calculating module for calculating the evaluation functional using measured input and measured output for each of the coefficient candidates of the PID controller; a removing module for removing a selected coefficient candidate if the evaluation functional is falsified as a result of a calculation of the evaluation functional; and a new coefficient candidate module for selecting new coefficient candidates as an update expression from remaining coefficient groups that have not been falsified, where the update expression is in the form of Particle Swarm Optimization (PSO).

DETAILED DESCRIPTION OF THE PREFERRED EMBODIMENTS

Figure 1:
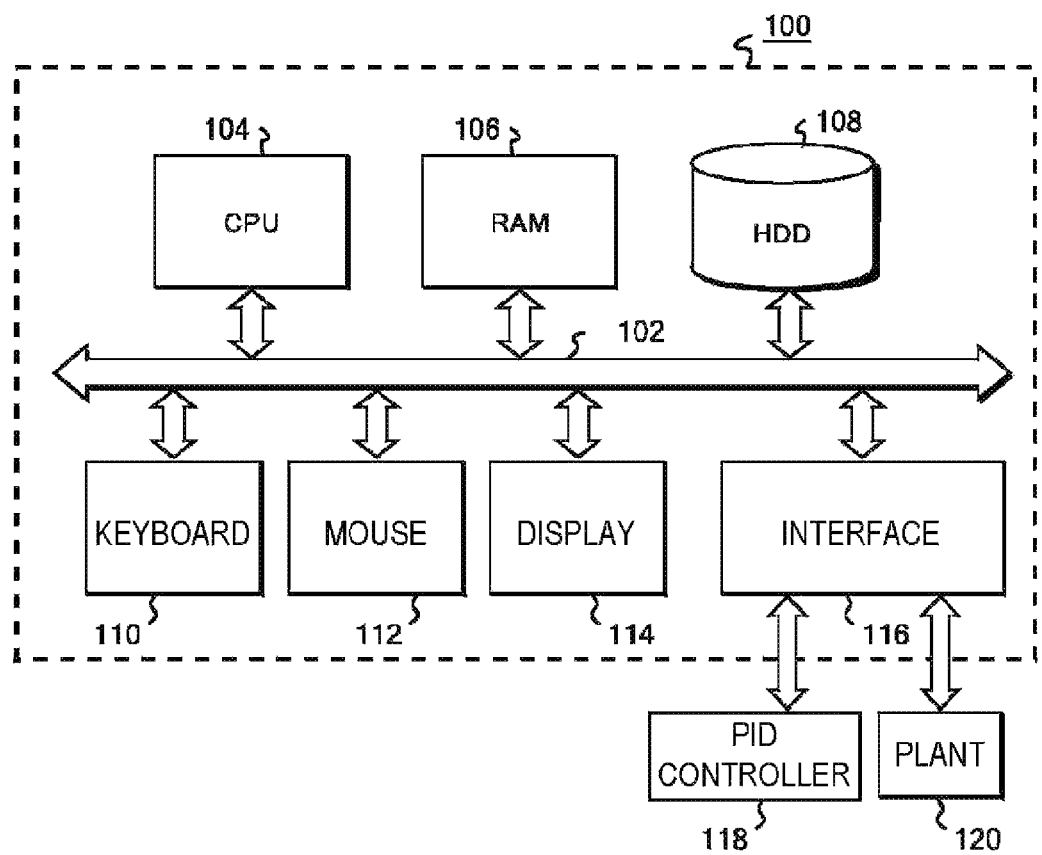
FIG. 1 is a schematic block diagram of an example of a control computer used in the present invention.

An embodiment of the present invention will be described in accordance with drawings. It is understood that these embodiments are for describing preferable aspects of the present invention and is not intended to limit the scope of the invention to what is shown here. Through the figures shown below, the same reference numerals denote the same objects unless otherwise specified.

It is an object of the present invention to configure a suboptimal robust PID controller that is automatically designed in an appropriate time if input and output can be observed, even in an unstable system or a system without sufficient prior information about a plant.

A system in accordance with the present invention provides a function of automatically and unfalsifiedly designing coefficients that realize robust stability in the whole system of a plant and a PID controller. The system performs a narrowing down at the first stage by excluding a combination falsified by input/output data from the massive coefficient space of the controller. At the second stage, a candidate group is moved while the evaluation function history of each candidate in the coefficient candidate group and the evolution history of the whole are shared. Concurrently, the coefficient space is automatically searched within the candidate group.

At the second stage, for the remaining group of PID gain candidates without being falsified by the first stage, the whole candidate group is moved toward a better center, while information about the minimum PID gain in the evaluation function history of each candidate and the PID gain, which has the minimum evaluation value in the history of the whole candidate group, are stored and shared to perform automatic search to determine whether or not there is a more appropriate value nearby. Concurrently, search of the candidates and removal of falsified candidates from the search result are executed to perform the automatic design.

The update expression used at the second stage is in the form of Particle Swarm Optimization (PSO). In the present invention, however, unfalsified control is performed even on peripheral search candidates of each particle in a candidate group by PSO. By using the evaluation criteria for PSO operation and the evaluation criteria for unfalsified control criteria, it is possible to perform search movement and deletion of falsified candidates simultaneously, and it is also possible to efficiently perform automatic design of PID coefficients with high appropriateness.

It has been conventionally necessary to repeat experiments when setting PID coefficients, and consequently too much time is spent through trial and error, even in cases when it is unlikely that other effective parameters exist. However, according to the present invention, it is possible to automatically determine appropriate PID coefficients within a reasonable time.

Referring to FIG. 1, a block diagram of the hardware of a control computer for controlling a PID controller in accordance with the present invention is shown. In FIG. 1, the hardware is connected a CPU 104, a main memory (RAM) 106, a hard disk drive (HDD) 108, a keyboard 110, a mouse 112 and a display 114 to a system bus 102. CPU 104 is preferably based on 32-bit or 64-bit architecture, and, for example, Pentium™ 4 by Intel Corporation, Core™ 2 DUO by Intel Corporation, Athlon™ by Advanced Micro Devices, Inc. or the like can be used. The main memory (RAM) 106 preferably has the capacity of 512 KB or more and, more preferably, the capacity of 1 GB or more.

Hard disk drive 108 stores an operating system and a processing program and the like according to the present invention, though they are not individually shown. The operating system can be any operating system that is suitable for the CPU 104, such as Linux™, Windows Vista, Windows XP™ and Windows™ 2000 by Microsoft Corporation, and Mac OS™ by Apple Computer, Inc.

Keyboard 110 and mouse 112 are used to operate graphic objects such as an icon, a task bar and a window displayed on display 114 in accordance with a graphic user interface provided by the operating system. Keyboard 110 and mouse 112 are also used to operate a data recording program to be described later.

Display 114 is preferably a 32-bit true color LCD monitor with resolution of 1024×768 or more though not limited thereto. Display 114 is used to display a program for recording data by a worker's full and decimated operations, numerical values of an evaluation result, and the like.

Hard disk drive 108 further stores a module for performing initial setting of PID coefficients, an unfalsified control module, a PSO module with unfalsified control, and a control module for integrating the whole. These modules can be created in any existing programming language such as C and Java®. In addition, the above modules can be appropriately loaded onto the main memory (RAM) 106, and can be executed by the function of the operating system.

Bus 102 further connects a PID controller 118 and a plant 120 controlled by PID controller 118, via suitable interface board 116 such as a PCI and a USB.

In this embodiment, PID controller 118 and plant 120 are separate pieces of hardware provided with a logic circuit such as an IC. Plant 120 is a mechanical apparatus to be controlled, for example, an engine, a brake, an air conditioner or the like.

Figure 2:
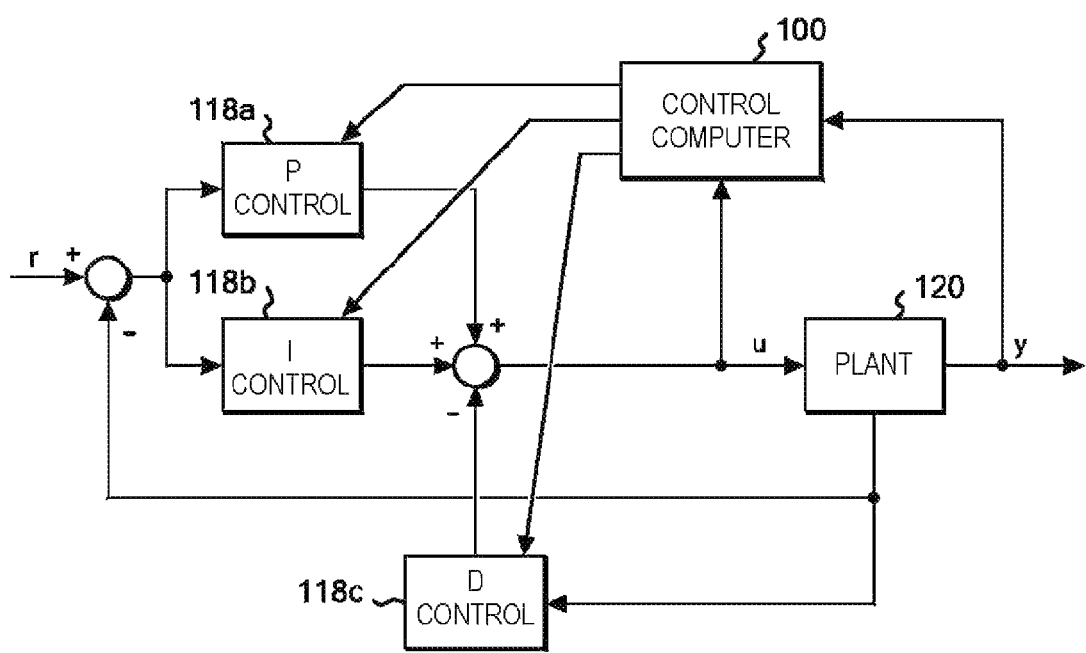
FIG. 2 is a block diagram showing connection between the control computer and a PID controller.

FIG. 2 is a functional block diagram for illustrating control of plant 120 by PID controller 118. PID controller 118 has P control block 118a for control by proportional term, I control block 118b for control by integral term, and a D control block 118c for control by derivative term.

Control computer 100 shown also in FIG. 1 appropriately sets coefficients for P control block 118a, I control block 118b and D control block 118c in accordance with its control function. Therefore, each of P control block 118a, I control block 118b and D control block 118c has a register for holding the value of the coefficient sent from control computer 100, though it is not shown in FIG. 1.

In the functional block diagram of FIG. 2, a target value r is given, and the target value r is inputted to plant 120 as an input u via P control block 118a and I control block 118b. An output of D control block 118c joins with the input u. Plant 120 outputs an output y, and the output y is given to the target value r as an amount of control, as an amount of operation.

Figure 3:
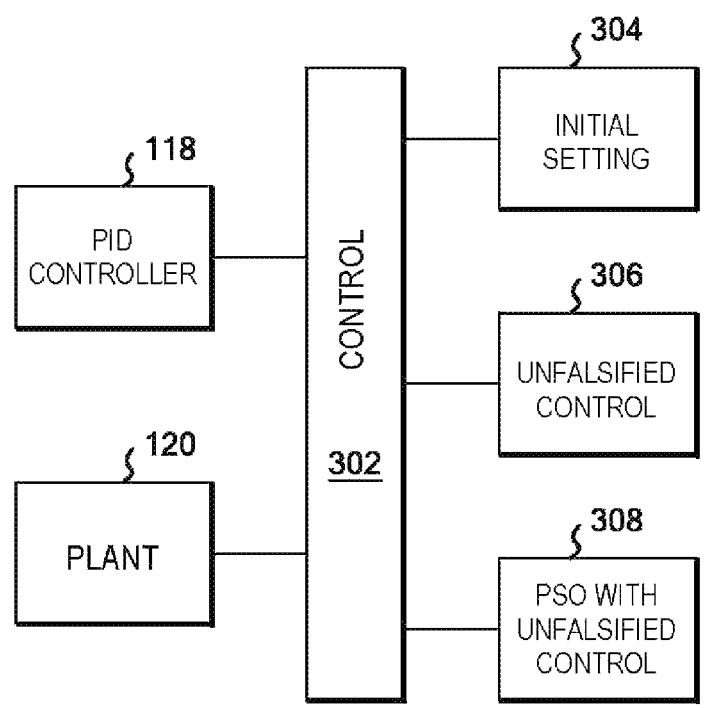
FIG. 3 is a functional block diagram of a process of determining coefficients for the PID controller in accordance with the present invention.

Next, referring to the functional block diagram of FIG. 3, the relation between modules stored in hard disk drive 108: initial setting module 304, unfalsified control module 306, PSO module with unfalsified control 308, and control module 302 for integrating the whole, and PID controller 118 and plant 120 will be described.

Initial setting module 304 has functions of setting an initial PID coefficient candidate group and sampling time, setting an evaluation functional, setting an unfalsified evaluation function from the evaluation functional, setting a measurement time length, selecting PID coefficients to be inputted to PID controller 118, and the like.

Unfalsified control module 306 has a function of removing a candidate for falsifying an evaluation function using a set unfalsified evaluation function and handing remaining candidates over to the PSO module with unfalsified control 308 after an elapse of a set measurement time.

PSO module with unfalsified control 308 has a function of removing a candidate for falsifying the evaluation function by applying PSO to the coefficient candidates handed over from unfalsified control module 306 and further using the unfalsified evaluation function to select final coefficient candidates.

The control module 302 has a function of interfacing between initial setting module 304, unfalsified control module 306, the PSO module with unfalsified control 308, and PID controller 118 and plant 120, via the interface board 116, and further has a function of measuring the input u and the output y to plant 120.

Figure 4:
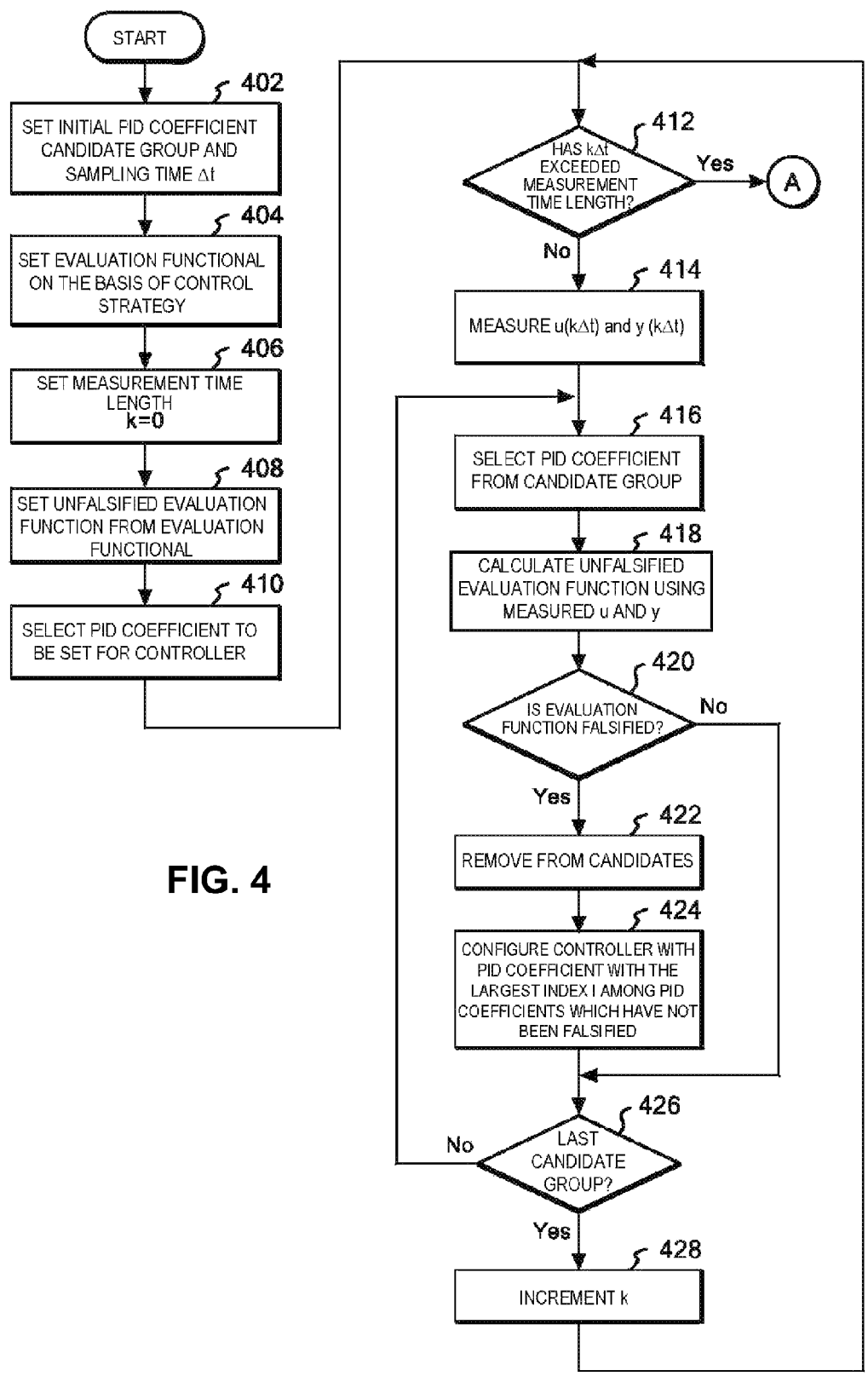
FIG. 4 is a flowchart of the process of determining coefficients for the PID controller in accordance with the present invention.

Next, the operation of the process according to the present invention will be described in more detail with reference to the flowcharts of FIGS. 4 and 5. First, two-degree-of-freedom PI-D control as shown by the following expression will be considered here.

$$u = \left(k_P + \frac{k_I}{s}\right)(r - y) - s \cdot k_D \cdot y \quad \text{[Expression 1]}$$

$k_P$, $k_I$ and $k_D$ denote PID gains of proportional, integral, and derivative, respectively; u denotes an input to a plant, r denotes a reference signal to be a target; and y denotes an output from the plant.

Then, at step 402, an operator sets an initial PID coefficient candidate group ($K_i$, i∈I={1, . . . , m}) and sampling time Δt using initial setting module 304.

At step 404, the operator sets an evaluation functional $T_{spec}$ on the basis of a control strategy, using initial setting module 304. Here, the evaluation functional $T_{spec}$ is, for example, expressed by the following expression.

$$T_{spec} = |w_1 * (r(t)-y(t))|^2 + |w_2 * u(t)|^2 - \sigma^2 - |r(t)|^2 \quad \text{[Expression 2]}$$

Here, σ denotes the root-mean-square of uncertain noise to be suppressed by robust control, * denotes convolution operation, and $w_1$ and $w_2$ denote weight filters. The following are examples of expressions for $w_1$ and $w_2$.

$$w_1(s) = \frac{s+10}{2(s+0.1)} \quad \text{[Expression 3]}$$

$$w_2(s) = \frac{0.01}{1.2(s+1)^3}$$

At step 406, the operator sets a measurement time length using initial setting module 304. Then, initial setting module 304 sets k=0 first. This k is incremented by one at a time as the step advances.

At step 408, initial setting module 304 calculates an unfalsified evaluation function as shown below from the evaluation functional $T_{spec}$ in accordance with the following expression.

$$J(t) = -\rho + \int_0^t T_{spec}(r(t), y(t), u(t)) dt \le 0, \forall t \in [0, \tau] \quad \text{[Expression 4]}$$

Here, ρ≥0 denotes any initial value, and τ denotes the whole observation time.

At step 410, initial setting module 304 selects PID coefficients to be set for PID controller 118. Here, the unfalsified control theorem described in "The unfalsified control concept and learning" by M G Safonov, T C Tsao, IEEE Transactions on Automatic Control, Vol. 42, No. 6, pp. 843-847, June 1997 described above is used. The selected PID coefficients are set for the P control block 118a, the I control block 118b and the D control block 118c of PID controller 118, respectively, as shown in FIG. 2.

At step 412, the control module 302 determines whether kΔt has exceeded the measurement time. If not, the process proceeds to step 414, and the control module 302 measures the input u (kΔt) and output y (kΔt) of plant 120.

At step 416, the control module 302 selects PID coefficients from the PID coefficient candidate group in accordance with certain order.

At step 418, unfalsified control module 306 calculates an unfalsified evaluation function using the measured u and y. Unfalsified control module 306 calculates $r_i((k+1)\Delta t)$ and $r_i(k\Delta t)$ for each i∈I first therefor.

For convenience of expression, r and J are to be identified with the following:

$$\tilde{r}, \tilde{J} \quad \text{[Expression 5]}$$

It is possible to calculate $r_i$ by filtering discrete measurement data (u, y) from the following expression.

$$\tilde{r}_i = y + \frac{s}{sk_{P_i} + k_{I_i}}\left(u + \frac{sk_{D_i}}{\varepsilon s + 1} y\right) \quad \text{[Expression 6]}$$

Then, unfalsified control module 306 calculates an evaluation function J(i, kΔt) using $r_i$ as shown below.

$$\tilde{J}(i, k\Delta t) = \quad \text{[Expression 7]}$$
$$\tilde{J}(i, (k-1)\Delta t) + \int_{(k-1)\Delta t}^{k\Delta t} T_{spec}(\tilde{r}_i(t), y(t), u(t)) dt \cong$$
$$\tilde{J}(i, (k-1)\Delta t) + \frac{1}{2}\Delta t\{T_{spec}(\tilde{r}_i(k\Delta t), y(k\Delta t), u(k\Delta t)) +$$
$$T_{spec}(\tilde{r}_i((k-1)\Delta t), y((k-1)\Delta t), u((k-1)\Delta t))\}$$

At step 420, control module 302 determines whether the evaluation function is falsified, using the result of the calculation of unfalsified control module 306. If J(i, kΔt)>0 is satisfied, then control module 302 determines that the evaluation function has been falsified, and removes the PID coefficients selected at step 416 from the candidates at step 422.

If it is determined at step 420 that the evaluation function has not been falsified, then the process proceeds to step 426.

At step 424, the control module 302 configures PID controller 118 with PID coefficients with the largest index i, among PID coefficients which have not been falsified.

At step 426, the control module 302 determines whether the candidate group is the last one or not. If not, the control module 302 returns to step 416, selects the next PID coefficients which have not been falsified in accordance with certain order, and repeats the process from step 418.

If it is determined at step 426 that the candidate group is the last one, then the control module 302 increments k at step 428 and returns to the determination step of step 412.

Figure 5:
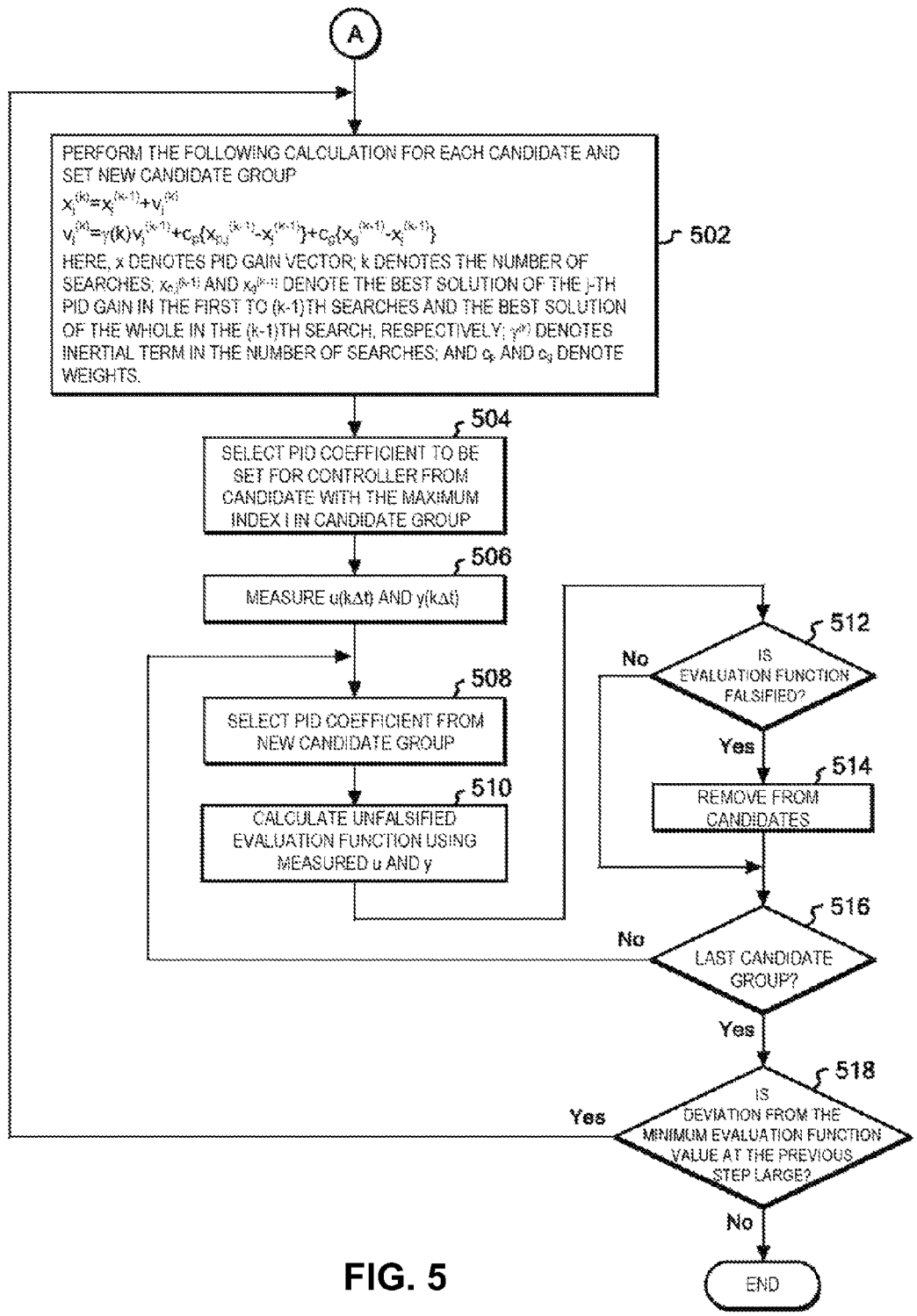
FIG. 5 is a flowchart of the process of determining coefficients for the PID controller in accordance with the present invention.

If it is determined at step 412 that kΔt has exceeded the measurement time, the control module 302 proceeds to the process shown by the flowchart of FIG. 5.

If it is determined at step 412 that kΔt has not exceeded the measurement time yet, then the control module 302 proceeds to step 414 and measures the input u (kΔt) and output y (kΔt) of plant 120. Then, the control module 302 proceeds to step 416. However, at the stage of just entering the step 416 from step 414, the control module 302 selects PID coefficients from the PID coefficient candidate group from the beginning of a predetermined order, excluding such that is falsified.

At step 502, the PSO module with unfalsified control 308 performs the following calculation for each candidate and sets a new candidate group.

$$x_j^{(k)} = x_j^{(k-1)} + v_j^{(k)}$$

$$v_j^{(k)} = \gamma^{(k)} v_j^{(k-1)} + c_p \{x_{p,j}^{(k-1)} - x_j^{(k-1)}\} + c_g \{x_g^{(k-1)} - x_j^{(k-1)}\}$$

Here, x denotes a PID gain vector; k denotes the number of searches; $x_{p,j}^{(k-1)}$ denotes the best solution of the j-th PID gain in the first to (k−1)th searches; $X_g^{(k-1)}$ denotes the best solution of the whole in the (k−1)th search; $\gamma^{(k)}$ denotes an inertial term in the number of searches; and $c_p$ and $c_g$ denote weights. The $c_p$ and $c_g$ are constants, which are random numbers arbitrarily given or the like.

Here, $\gamma^{(k)}$ is a function of k as shown by the following expression.

$$\gamma^{(k)} = \gamma_{max} - \frac{\gamma_{max} - \gamma_{min}}{k_{max}} k \qquad \text{[Expression 8]}$$

Here, $\gamma_{max}$ denotes the maximum value of an inertial term coefficient; $\gamma_{min}$ denotes the minimum value of the inertial term coefficient; and $k_{max}$ denotes the maximum number of searches.

Here, the best solution is obtained by holding an evaluation function value history for each PID gain after starting search, and regarding the PID gain as the best solution when the minimum evaluation function value is taken. However, the history is not held for such PID gain that is falsified during the search.

At step 504, the control module 302 selects, from the candidate group, a candidate with the largest index i as PID coefficients, and sets the selected PID coefficients for PID controller 118.

At step 506, the control module 302 measures the input u (kΔt) and the output y (kΔt) of plant 120.

At step 508, the control module 302 selects PID coefficients from a new PID coefficient candidate group in accordance with certain order.

At step 510, the PSO module with unfalsified control 308 calculates an unfalsified evaluation function using the measured u and y, by processing similar to step 418.

At step 512, if it is determined that the evaluation function has been falsified, by processing similar to step 420, the PSO module with unfalsified control 308 removes the falsified candidate at step 514, and the process proceeds to determination step of step 516. If the PSO module with unfalsified control 308 determines that the evaluation function has not been falsified, then the process proceeds to step 516.

At step 516, the control module 302 determines whether the candidate group is the last one or not. If not, the control module 302 returns to step 508, selects the next PID coefficients which have not been falsified in accordance with certain order, and repeats the process from step 510.

If it is determined at step 516 that the candidate group is the last one, then the control module 302 proceeds to step 518 and determines whether the deviation from the minimum evaluation function value at the previous step is larger than a predetermined threshold. If not, the control module 302 ends the process.

If the deviation from the minimum evaluation function value at the previous step is larger than the predetermined threshold at step 518, the process from step 502 is performed again. Here, the minimum evaluation function value is the minimum value among all the evaluation function values calculated on the basis of unfalsified control criteria when a candidate group performs nearby search according to the unfalsified control criteria on the basis of each PSO.

Though the control computer 100 is assumed to be a general-purpose computer like a personal computer in the above embodiment, it is also possible to use a microcomputer having equal functions and dedicated hardware having a memory and interface means.

Furthermore, one or both of PID controller 118 and plant 120 can be not configured with a hardware logic circuit but created by simulation software such as MATLAB®/Simulink®. If both of PID controller 118 and plant 120 are software modules, they are stored in hard disk drive 108, and all the PID coefficient determination process is completed in the control computer 100 without using the interface board 116.

Furthermore, one skilled in the art will understand that the present invention is not limited to a platform such as particular hardware and software and can be realized any platform.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining coefficients for a proportional—integral—derivative controller (PID controller), the method comprising the steps of:

providing initial values of a coefficient candidate group for a PID controller, wherein said coefficient candidate group comprises coefficient candidates;

providing an evaluation functional, wherein an unfalsified evaluation function is calculated from said evaluation functional;

measuring an input and an output of a plant;

selecting said coefficient candidates from said coefficient candidate group;

calculating said evaluation functional using measured input and measured output for each of said coefficient candidates of said PID controller;

removing a selected coefficient candidate if said evaluation functional is falsified as a result of a calculation of said evaluation functional;

selecting new coefficient candidates as an update expression from remaining coefficient groups that have not been falsified, wherein said update expression is in the form of Particle Swarm Optimization (PSO) and an evaluation function value is used in selecting said new coefficient candidates; and repeating said steps of calculating and removing for each of said new coefficient candidates of an updated coefficient candidate group, wherein at least one of the steps is carried out using a computer device.

2. The method according to claim 1, wherein said plant and said PID controller are configured with hardware logic circuits.

3. The method according to claim 1, wherein said plant and said PID controller are configured with simulated software modules.

4. A non-transitory computer readable storage medium tangibly embodying a computer readable program code having computer readable instructions which when implemented, cause a computer to carry out the steps of a method comprising:
   providing initial values of a coefficient candidate group for a PID controller, wherein said coefficient candidate group comprises coefficient candidates;
   providing an evaluation functional, wherein an unfalsified evaluation function is calculated from said evaluation functional;
   measuring an input and an output of a plant;
   selecting said coefficient candidates from said coefficient candidate group;
   calculating said evaluation functional using measured input and measured output for each of said coefficient candidates of said PID controller;
   removing a selected coefficient candidate if said evaluation functional is falsified as a result of a calculation of said evaluation functional;
   selecting new coefficient candidates as an update expression from remaining coefficient groups that have not been falsified, wherein said update expression is in the form of Particle Swarm Optimization (PSO) and an evaluation function value is used in selecting said new coefficient candidates; and
   repeating said steps of calculating and removing for each of said new coefficient candidates of an updated coefficient candidate group.

5. The computer readable storage medium according to claim 4, wherein said plant and said PID controller are configured with hardware logic circuits.

6. The computer readable storage medium according to claim 4, wherein said plant and said PID controller are configured with simulated software modules.

7. A system for determining coefficients for a PID controller, the system comprising:
   a memo a processor device communicative coupled to said memory, and a module for determining coefficients for the PID controller coupled to said memory and said processor device to car out the steps of:
   providing initial values of a coefficient candidate group for a PID controller, wherein said coefficient candidate group comprises coefficient candidates;
   providing an evaluation functional, wherein an unfalsified evaluation function is calculated from said evaluation functional;
   measuring an input and an output of a plant;
   selecting said coefficient candidates from said coefficient candidate group;
   calculating said evaluation functional using measured input and measured output for each of said coefficient candidates of said PID controller;
   removing a selected coefficient candidate if said evaluation functional is falsified as a result of a calculation of said evaluation functional; and
   selecting new coefficient candidates as an update expression from remaining coefficient groups that have not been falsified, wherein said update expression is in the form of Particle Swarm Optimization (PSO) and an evaluation function value is used in selecting said new coefficient candidates.

8. The system according to claim 7, wherein said plant and said PID controller are configured with hardware logic circuits.

9. The system according to claim 7, wherein said plant and said PID controller are configured with simulated software modules.

* * * * *